(12) United States Patent  
Wang et al.

(10) Patent No.: US 7,937,261 B2  
(45) Date of Patent: May 3, 2011

(54) TRANSLATION ON DEMAND

(75) Inventors: Qiheng (Henry) Wang, St Louis, MO (US); Xuejun (Jason) Wang, Fremont, CA (US)

(73) Assignee: Movo Technology Co. Ltd., Beijing (CN)

( * ) Notice: Subject to any disclaimer, the term of this patent is extended or adjusted under 35 U.S.C. 154(b) by 928 days.

(21) Appl. No.: 11/816,527

(22) PCT Filed: Dec. 18, 2006

(86) PCT No.: PCT/US2006/048567  
§ 371 (c)(1),  
(2), (4) Date: Aug. 17, 2007

(87) PCT Pub. No.: WO2008/076115  
PCT Pub. Date: Jun. 26, 2008

(65) Prior Publication Data  
US 2009/0204389 A1    Aug. 13, 2009

(51) Int. Cl.  
*G10L 15/00* (2006.01)

(52) U.S. Cl. ........................... 704/2; 704/8; 707/4

(58) Field of Classification Search ............ 704/2, 8; 707/4  
See application file for complete search history.

(56) References Cited

U.S. PATENT DOCUMENTS

| | | | |
|---|---|---|---|
| 6,466,914 B2 | 10/2002 | Mitsuoka et al. | |
| 6,571,241 B1 | 5/2003 | Nosohara | |
| 6,993,473 B2 * | 1/2006 | Cartus | 704/2 |
| 7,580,830 B2 * | 8/2009 | Al-Onaizan et al. | 704/2 |
| 2005/0010419 A1 | 1/2005 | Pourhamid | |
| 2005/0097129 A1 | 5/2005 | Ikeda | |
| 2006/0271352 A1 * | 11/2006 | Nikitin et al. | 704/9 |
| 2007/0067154 A1 * | 3/2007 | Ryan, III | 704/8 |
| 2009/0125497 A1 * | 5/2009 | Jiang et al. | 707/4 |
| 2010/0115424 A1 * | 5/2010 | Young et al. | 715/753 |

* cited by examiner

*Primary Examiner* — Daniel D Abebe  
(74) *Attorney, Agent, or Firm* — James M. Wu; Jw Law Group

(57) ABSTRACT

A translation on demand ("TOD"), in one embodiment, receives a search request with a search term from a user in a native language across the Internet. The search term is translated into at least one foreign language using automatic translation software ("ATS") according to specifications listed with the search request. After the search term is translated, a search with the search term in both native and foreign languages is performed. Once receipt of the outcome of the search, search results are displayed, wherein each entry or document of the search results also includes a brief description presented in the native language. The TOD system also generates multiple TOD price selections. The TOD price selections allow a user to place an order to translate a selected document. A translation job order for translating the selected document is then distributed for bidding over the network.

14 Claims, 5 Drawing Sheets

TRANSLATION ON DEMAND

CROSS-REFERENCE TO RELATED APPLICATION

This application claims priority based on International Patent Application No. PCT/US2006/048567, entitled "Translation on Demand" by Qiheng Wang and Xuejun Wang, filed on Dec. 18, 2006.

TECHNICAL FIELD

The present disclosure relates generally to a communication network, and more particularly, the present disclosure relates to an interactive communications system.

BACKGROUND

Internet use has rapidly gained popularity in recent years, particularly in the United States, Europe, and Asia. The Internet or World Wide Web benefits not only businesses and retailers, but also entertainment and news media. However, a problem associated with the currently available Internet use is the language barrier. For example, English users often have difficult times accessing non-English websites, such as Chinese websites.

A convention solution to mitigate the language barrier is to use translation services. Although typical translation services have existed for years, they are limited by locations, turn around time, and high expenses. Another conventional solution is to use machine or computer translation, which typically can perform a translation almost instantaneously and inexpensively. However, the complexity of a different language translation often causes the proficiency of the translation to be unacceptable and unreliable.

Accordingly, there is a need in the art to improve the Internet translation to overcome the language barrier.

SUMMARY

An apparatus and method of translation on demand ("TOD") for providing language translation over a network is disclosed. A TOD system, in one embodiment, is capable of receiving a search request with a keyword from a user in a native language across the Internet. The keyword is subsequently translated into at least one foreign language using automatic translation software ("ATS") according to the specifications of the search request. An Internet search with the keyword in both native and foreign languages is performed. A set of search results in response to the Internet search is displayed, wherein each entry or document of the search results further includes a brief description of the entry or document illustrated in the native language. TOD system also generates multiple TOD price selections. The TOD price selections allow a user to place an order to translate a selected document. A translation job order for translating the selected document is then distributed for bidding over the network. In another embodiment, TOD system facilitates and allows Internet users participating translation biddings as well as benefiting from such participations.

Additional features and benefits of the present invention will become apparent from the detailed description, figures and claims set forth below.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments, which, however, should not be taken to limit the invention to the specific embodiments, but are for explanation and understanding only.

In the drawings.

DESCRIPTION OF EXAMPLE EMBODIMENTS

Figure 1:
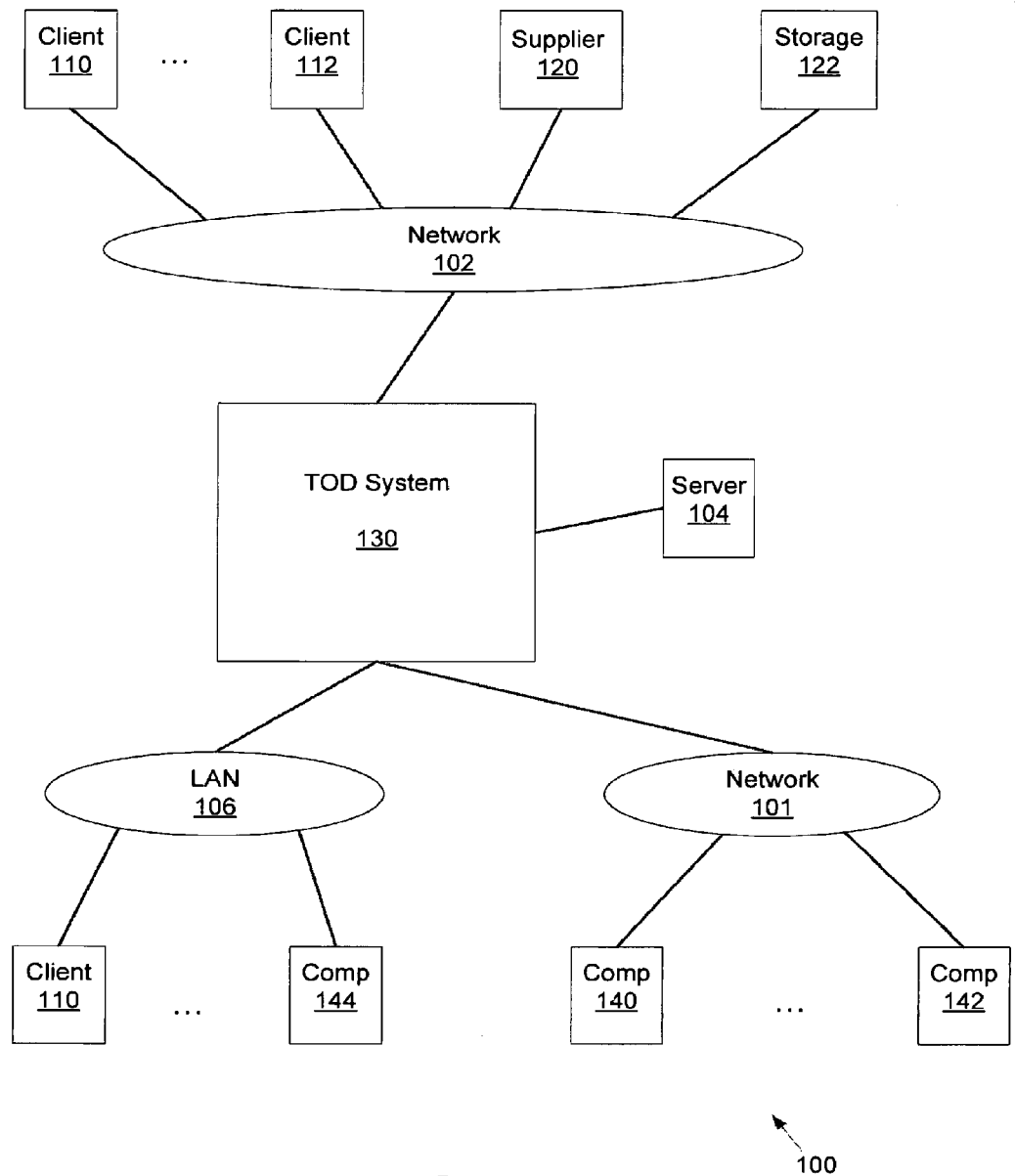
FIG. 1 is a computer network topology illustrating a network environment in which the TOD system can be implemented in accordance with one embodiment of the present invention.

An apparatus and method for global web search using translation on demand ("TOD") are disclosed.

Example embodiments are described herein in the context of a communications network including computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method including a series of process steps is implemented by a computer or a machine and those process steps can be stored as a series of instructions readable by the machine, they may be stored on a tangible medium such as a computer memory device (e.g., RAM (random access memory), MRAM (magnetic RAM), or ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The present invention, in one embodiment, discloses a communications network such as Internet or a mobile network platform that enhances web search capability by crossing language barriers. The capability of crossing language barriers will make Internet communications available between users with different native languages. Without such capability of crossing language barriers, users can hardly have ways even to know information available from users of different native languages. Language is a basic tool to start communications. A TOD system offers a cost effect and fast turn around translation task by facilitating a worldwide bid for the translation job using a global network. In one aspect, the TOD system provides a search and translation on demand if the user decides to translate a selected document from the search results. The present invention provides a translation environment that allows Internet users to request keyword searches, document translations, and facilitates bids from numerous translation service providers worldwide.

A TOD system, in one embodiment, is capable of receiving a search request with a keyword from a user in a native language across the Internet. The keyword is subsequently translated into at least one foreign language using automatic translation software ("ATS") according to the specifications of the search request. An Internet search with the keyword in both native and foreign languages is performed. A set of search results in response to the Internet search is displayed, wherein each entry or document of the search results further includes a brief description of the entry or document illustrated in the native language. The TOD system also generates multiple TOD price selections. The TOD price selections allow a user to place an order to translate a selected document. A translation job order for translating the selected document is then distributed for bidding over the network.

FIG. 1 is a computer network topology 100 illustrating a network environment in which a TOD system 130 is implemented in accordance with one embodiment of the present invention. In this network environment, TOD system 130 is coupled to wide-area networks 101-102. In one embodiment, wide-area networks 101-102 are the same network. Wide-area networks 101-102 include the Internet, mobile Internet or other proprietary networks including America On-Line™, SBC™, Microsoft Network™, and Prodigy™. Wide-area networks 101-102 may further include network backbones, long-haul telephone lines, Internet service providers, various levels of network routers, and other means for routing data between computers, cell phones and other intelligent appliances.

The Internet is a wide-area network, which is a global and publicly accessible communications network. The Internet connects computers and servers worldwide for facilitating data transmission by packet switching using, for example, the Internet Protocol (IP). The Internet also links many smaller private, academic, business, and government communication networks, which provide information and services, such as electronic mail, online shopping, online chat, file transfer, and the interlinked Web pages and other documents of the World Wide Web.

Server 104 is coupled to TOD system 130 and it is, in one aspect, used to assist routing data to clients 114-116 through a local-area network ("LAN") 106 and wide-area networks 101-102. The LAN connection allows client system 114 to communicate with TOD system 130 or other systems through LAN 106 and to communicate with clients 110-112 via LAN 106 and wide-area network 102. Using conventional network protocols, TOD system 130 may communicate through wide-area network 102 to a plurality of client computer systems 110-112, supplier system 120 and storage device 122. For example, client system 110 is connected directly to wide-area network 102 through direct or dial-up telephone or other network transmission lines. Alternatively, clients 110-112 may be connected through wide-area network 102 using a modem pool.

Using one of a variety of network connection means, TOD system 130, which could be a personal computer ("PC"), a mini-computer, a server, a workstation, server clusters, or a mainframe computer, can support multiple applications of network search and translations to multiple clients simultaneously across the network. In one embodiment, TOD system 130 is capable of performing real-time language translation (i.e., translation from Chinese to English) using automatic translation software ("ATS"), which may reside in Server 104. An advantage of having the capability of real-time language translation is to enhance search capability. For example, TOD system 130 enables a Chinese search term or keyword to be searched in English websites over the Internet. TOD system 130 is further connected to various translation companies or translation service providers 142-144 over the network. Furthermore, TOD system 130 may store and retrieve various electronic information (or data) in storage system 122 through wide-area network 102. TOD system 130 is capable of obtaining information from supplier system 120 via the network. It should be obvious to one skilled in the art that it is within the scope of the present invention if additional systems are added to or subtracted from the computer network 100.

Figure 2:
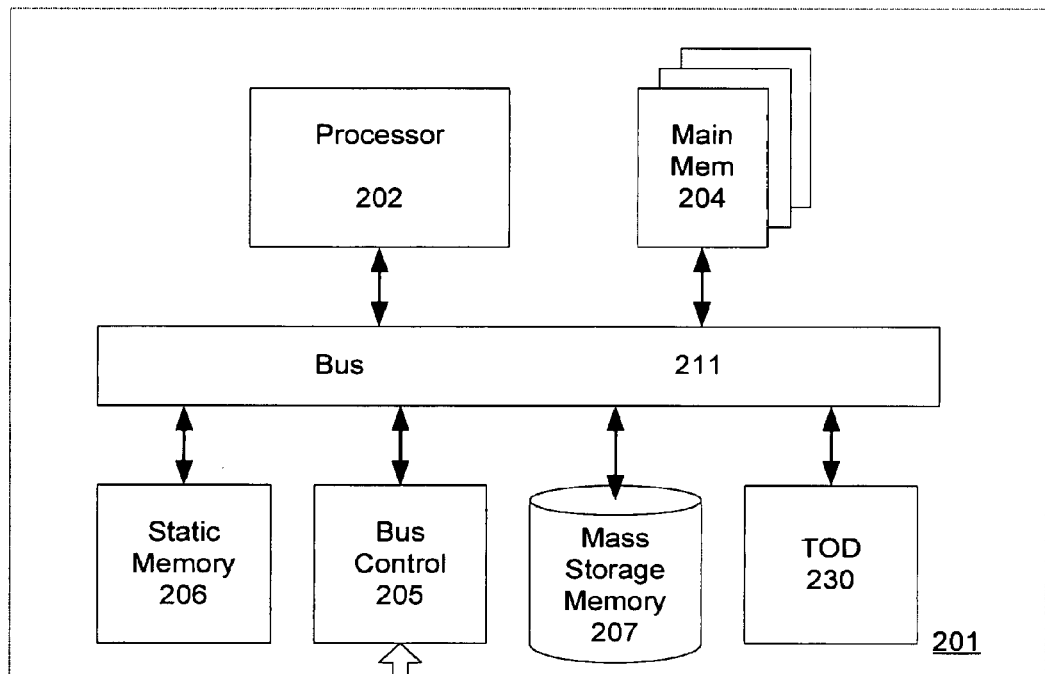
FIG. 2 illustrates a computer system in which the TOD system can be implemented in accordance with one embodiment of the present invention.

Having briefly described one embodiment of the network environment in which the present invention operates, FIG. 2 illustrates an example of a computer system 200, which is an exemplary client system 110-116 or a computer system in which the features of the present invention may be implemented. Process of the translation on demand can be implemented in any processor-based computer system, such as a PC, a workstation, or a mainframe computer. It will be apparent to those of ordinary skill in the art that other alternative computer system architectures may also be employed.

Referring back to FIG. 2, computer system 200 includes a processing unit 201, an interface bus 212, and an input/output ("I/O") unit 220. Processing unit 201 includes a processor 202, a main memory 204, a system bus 211, a static memory device 206, a bus control unit 205, a mass storage memory 207, and a TOD module 230. Bus 211 is used to transmit information between processing unit 201 and I/O unit 220 for data processing. Processor 202 may be any of a wide variety of general-purpose processors or microprocessors such as Pentium™ microprocessor, AMD™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. TOD module 230 may, in one embodiment, be an independent component (IC) that performs functions of translation on demand for translating documents from a foreign language to a native language. In another embodiment, TOD module 230 may reside within processor 202, main memory 204, and/or static memory 206.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221, for example, projects or displays images of search results. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server 104 or other computers, through wide-area networks 101-102. Communication device 225 may include a modem or a network interface device, or other similar devices that facilitate communication between computer 200 and the network. Computer system 200 may be coupled to a number of servers 104 via a network infrastructure such as the infrastructure illustrated in FIG. 1. It should be noted that the terms, such as the Internet, a wide-area network, a wireless communications network, a communications network, a global network, World Wide Web, are used interchangeably herein.

Figure 3:
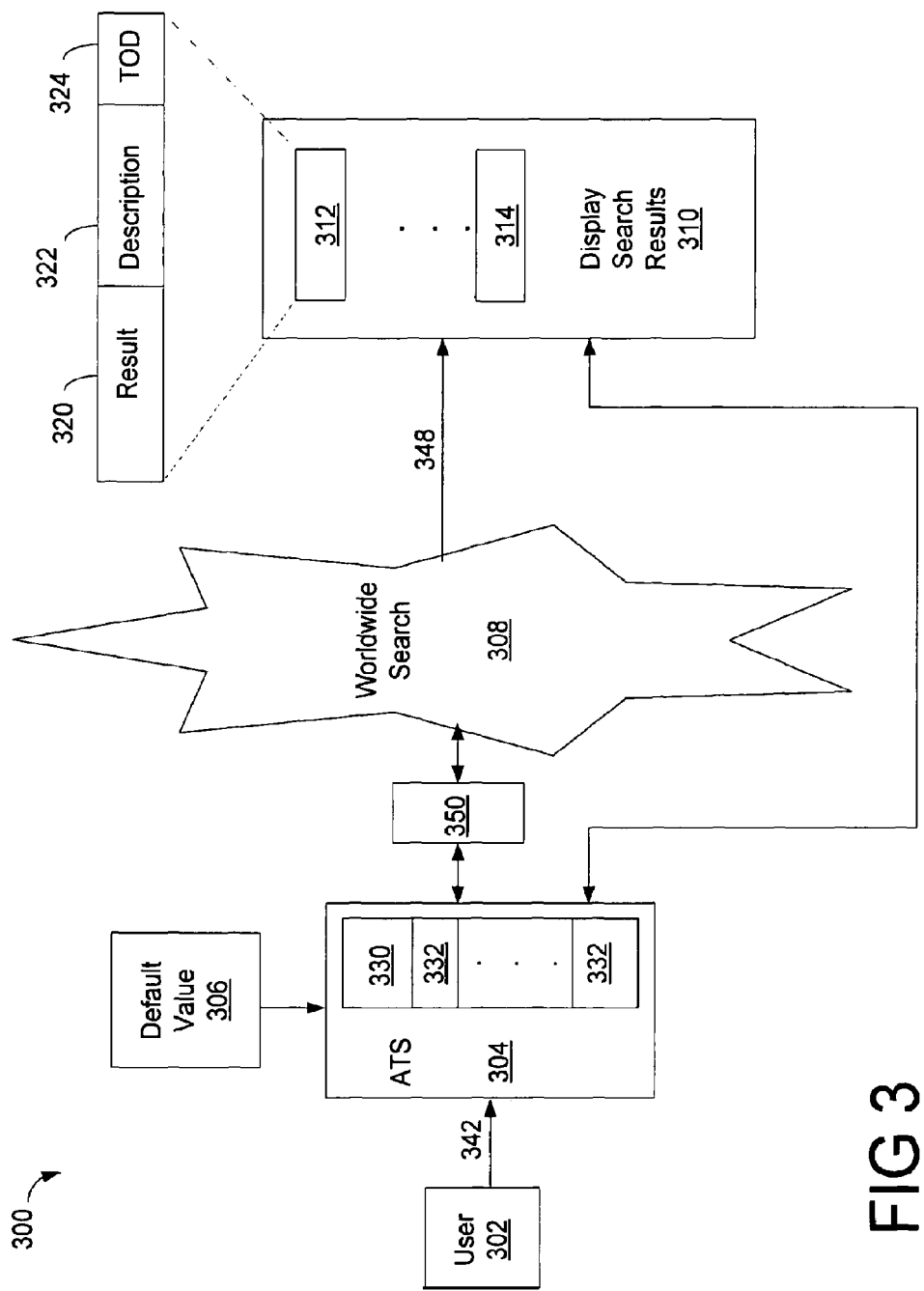
FIG. 3 is a block diagram illustrating a process of obtaining search results in accordance with one embodiment of the present invention.

FIG. 3 is a block diagram illustrating a process 300 of obtaining search results employing multiple language searches in accordance with one embodiment of the present invention. Process 300 is initiated when a user 302 submits a search request. User 302 can be internal to the TOD system, connected to the TOD system through a LAN, or connected to the system through a global network, such as the Internet, via connection 342. In another embodiment, user 302 can be a machine instead of a human computer operator. User 303 is locally connected to ATS module 304 over a network.

ATS module 304, in one embodiment, is a software program capable of translating an object from the native language to one or more foreign languages with similar meanings and contents. The object can be a word, a sentence, a title, an article, a book, a song, a movie, and so forth. The proficiency (or quality of translation) of ATS module 304 may vary from primitive translation to sophisticated translation depending on the availability of the latest software. ATS module 304 used in the present invention, in one embodiment, can be commercially available translation software and can be loaded in the TOD system. Alternatively, ATS module 304 may reside on a remote server, which is coupled to the TOD system via a LAN or the Internet.

It should be noted that ATS module 304 may contain numerous ATS components 330-334 wherein each component is responsible for translating one foreign language. For example, component 330 is responsible for translating an object such as a search keyword from the native language such as English to Chinese. Also, component 332 may be responsible for German translation while component 334 is responsible for Japanese translation. It should be further noted that component 330-334 may reside in different servers (or computer) for different component and they may be coupled to ATS module 304 via the Internet or other types of communications network.

During an operation, ATS module 304 translates the search term, which can be search keywords or sentences, from the native language into one or more foreign languages according to the search request received from user 302. In one embodiment, user 302 can specify the number and types of language to be searched in the search request. For example, user 302 can specify that the search term should be searched in English, Chinese, and Japanese websites or web pages. If user 302, however, fails to specify the number and the type of languages to be searched, ATS module 304 will translate the search keywords according to a predetermined default value 306. For instance, default value 306 may instruct ATS module 304 to translate the search term from the native language into six (6) foreign languages, such as Chinese, Japanese, German, French, Spanish, and Russian. Upon completion of the translation, ATS module 304 passes the search term including both native and foreign search terms to a search engine 350 to perform a worldwide search or a local, search within one website. Search engine or web browser 350 launches a worldwide search 308 via the Internet or other communications network. For example, search engine 350 uses the English search term to search English websites, the Chinese search term to search Chinese websites, and the German search term to search German websites. The search can also be done in one website, wherein the contents of this website are in different languages. When the search result(s) from various websites are obtained, display search results 310 displays the search result(s) on a display or a computer terminal.

Display search results 310, in one embodiment, is capable of displaying multiple entries of search results 312-314 wherein the entries 312-314 are ordered in accordance with an entry order criteria. The entry order criteria specify how to display entries of search results 312-314. For example, the entry order criteria provide information to display search result 310 that entries 312-314 to be displayed should be ordered in a sequence according to date, location, and/or language. The entry order criteria, in one embodiment, contain different criteria for different types of search results. For example, the entry order criteria for a list of documents are different from the entry order criteria for a list of songs. The entry order criteria, in one embodiment, are predefined set of values stored in the TOD system, but they can be overridden manually by user 302. For example, user 302 can specifically define in the search term that the entries having the most recent dates should be on the top of the list.

Referring back to FIG. 3, each of entries of search results 312-314, in one embodiment, includes a result portion 320, a description portion 322, and a TOD price selection 324. Result portion 320, in one embodiment, shows a title of a document or a song, hereinafter referred to as a document, as the result of a worldwide search 308. Description portion 322 is a brief description of the document in the native language. For example, description portion 322 can be an abstract of a document. In the event that the document is in foreign language, description portion is instantly translated by a machine translator such as performed by ATS module 304.

TOD price selection 324, in one embodiment, is a set of translation options and allows a user to place a translation order for a selected document associated with an entry of a search result. The set of translation options includes a list of prices associated with a list of translation service providers, who may be certified by the TOD system from high, median, to low proficiency. For example, after reviewing of description portion 322, user 302 can select TOD price selection 324 to order an entirely translated document. It should be noted that, due to the limitations of the ATS, the translated brief description illustrated in description portion 322 can be primitive and/or relatively low quality (or low proficiency) translation although it may convey the main idea of document. It should be noted that ATS module 304, default value 306, search engine (or browser) 350, and display search result 310 can be part of the TOD system.

Figure 4:
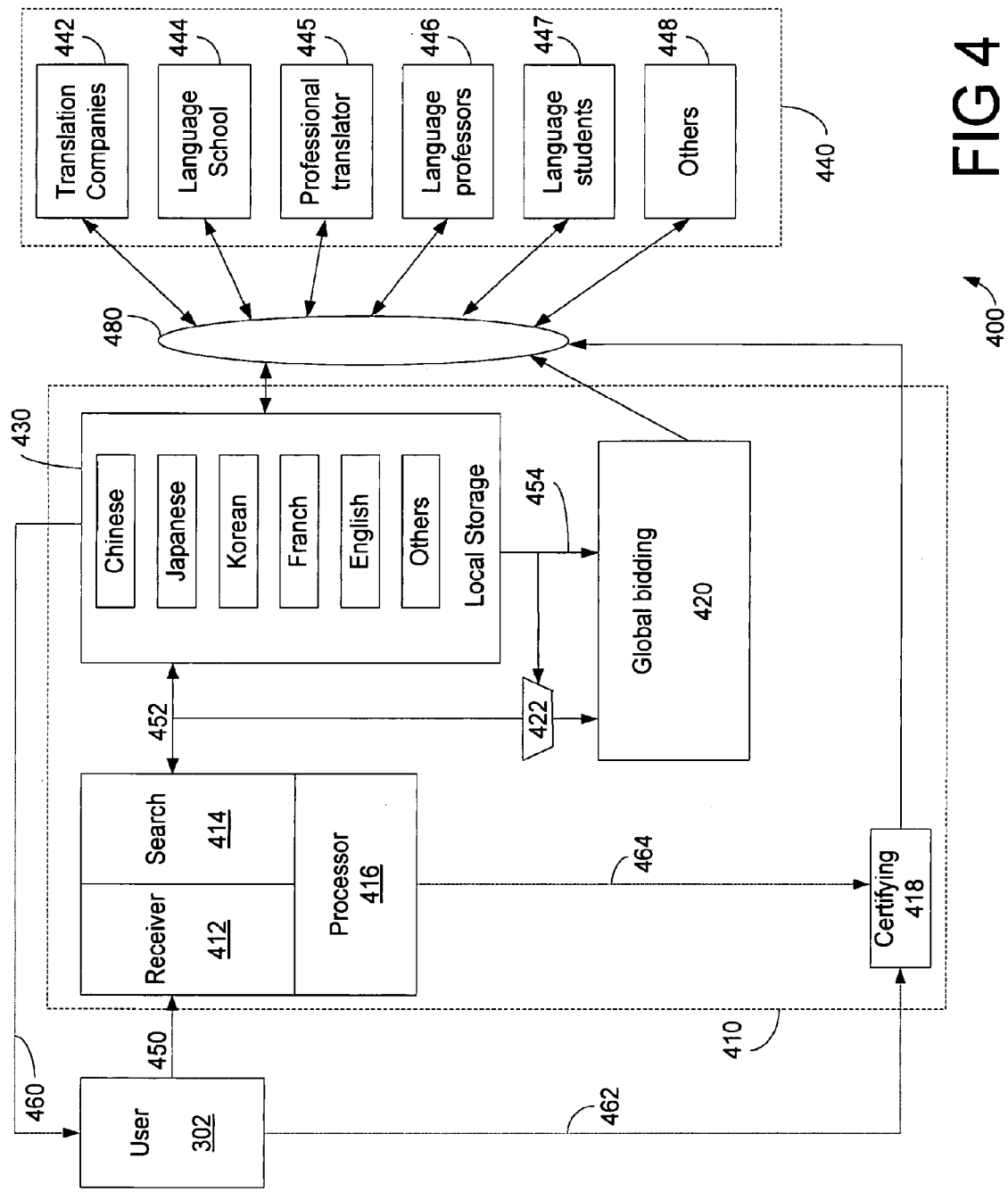
FIG. 4 is a block diagram illustrating a bidding process for TOD in accordance with one embodiment of the present invention.

FIG. 4 is a block diagram 400 illustrating a bidding process for a TOD system in accordance with one embodiment of the present invention. Block diagram 400 includes user 302, a TOD system or platform 410, translation service providers 440, and a communications network 480. Communications network 480, which may be a similar network 308 as shown in FIG. 3, is the Internet, which provides and facilitates a worldwide bidding platform for performing an efficient and cost-effective translation task. It should be noted that FIG. 4 could be a process of logically continuation of the process illustrated in FIG. 3.

TOD system 410 further includes a processor 416, a receiver 412, a search module 414, a local storage 430, and a certifying logic 418. Search module 414, in one embodiment, further includes a local search and a global search. Search module 414 is configured to be coupled to local storage 430 and a global bidding component 420. In another embodiment, local storage 430 and global bidding 420 are a part of search 414. TOD, system 410 also includes ATS module 304, search engine (or web browser) 350, and display search result 310, as shown in FIG. 3 and its corresponding description. In one embodiment, processor 416 controls data flow between various components to enhance search capability and translation on demand.

Receiver 412 is configured to receive a TOD price selection 324 from user 302 over a connection 450, wherein connection 450 may include a LAN and/or a wider-area network. Once TOD price selection 324 is received and evaluated, a search unit 414 first performs a local search and then launches a global search if the search results are not found in the local storage. Search unit 414, in one embodiment, searches a local storage 430 to determine whether the selected document, which is specified by TOD selection 324, has been translated before. If the selected document was translated before in accordance with TOD price selected 324, Search unit 414 identifies whether the translated document is still in local storage 430.

Local storage 430, in one embodiment, includes multiple memory devices wherein each memory device may be designated to store the data relating to one type of language. For example, local storage 430 stores data relating to Chinese documents in Chinese memory device, data relating to Japanese documents in Japanese memory device, data relating to Korean documents in Korean memory device, data relating to French documents in French memory device, and data relating to English documents in English memory device. It should be noted that local storage 430 may reside in a remote server connected to TOD system 410 remotely over a network or connection 452. It is further noted that some of the memory devices in local storage 430 may reside in another system and they are connected to local storage 430 via various networks.

If the translated document specified by TOD price selection 324 is found in local storage 430, the translated document is retrieved and delivered with a specified format. For example, user 302 can specify the delivery format in a PDF format or in a paper format. If, however, the translated document is not found in local storage 430, search unit 414 and local storage 430, in one embodiment, activates a gating device 422 to launch a global bidding for translating the selected document.

A global bidding component 420, in one embodiment, generates a translation job order in accordance with TOD price selection 324, and subsequently distributes the translation job order to translation service providers 440 for bidding using communications network 480. In one aspect, global bidding component 420 distributes the translation job order to certified translation service providers 440. In another embodiment, global bidding component 420 distributes the translation job order to a translation department internal to TOD system. For example, the platform or entity or company hosts TOD system 410 may have its own internal translation department for quick and high quality translation.

When translation job order is distributed for bidding, each certified translator of the translation service providers 442-448 can answer the bid. Depending on the criteria of the translation, such as the type of language, turn around time, and number of words, each certified translator can submit a price (or a bid) to perform the translation. For example, a translation company 442, which is a professional translation companies, can participate the bidding, wherein the bid should indicate a price and the turn around time. Translation service provider 440 includes multiple types of providers, such as translation companies 442, language school 444, professional translator 445, language professors 446, language students 447, and others 448. In one embodiment, language school 444 includes various language institutions that can perform the translation. Professional translator 445 includes various individual translator and language professors 446 include university language professors. Also, language students 447 include native and foreign students who can translate the selected document. It should be noted that translators are physically located around the world but they are connected via communication networks.

Once the bids are received over communications network 480, global bidding 420 evaluates the bids according to predefined bidding rules, such as price versus proficiency to determine which bid is the most efficient and cost effective translator to perform the translation. If a bid is accepted, a bid winner translator is notified by global bidding 420. When the translated document is received, processor 416 stores the translated document together with its TOD price selection 324 in local storage 430. Once the translated document is formatted to comply with the user specification, a translated document is delivered.

A recertification process is initiated by certifying device 418 after the delivery of the translated document. In one embodiment, certifying device 418 reevaluates and recertifies the bid winning translator in accordance with inputs from user 302 via connection 462 and TOD system 410 via connection 464. It should be noted that TOD system 410 can be implemented in hardware, software, or a combination of hardware and software.

In summary, TOD system or platform 410 essentially provides a cross language worldwide search and translation on demand. When a user 302, for example, wants to search for specific information, a search term in user's native language is entered. The search term is then translated into several languages specified by user 302 or by default. Search engine 350 subsequently searches related content through multiple languages. A set of search results together with brief descriptions are displayed in user's native language. If the search results are in foreign language, they will be translated using automatic translation software. The brief description can be sophisticated or primitive depending on the translation software used. The brief description, however, should contain enough information to provide a general idea of the content of the result.

If user 302 wants to have more accurate and complete copy of the result or document in user's own native language, the user can place a translation demand through TOD system 410. TOD system 410 will provide user 302 with different translation service levels (proficiency and turn around time) with different cost estimations. After user 302 makes a choice, the request of translation demand will be distributed to translation service providers 440 around the world for bidding. The winner of the bids will perform the translation. The translated document or translation will be delivered to user with user preferred format by TOD platform 410. A customer evaluation system (or recertifying device) will be used to ensure the service quality.

An advantage of the present invention is that TOD system 410 can tract the number of document and/or translated document that has been delivered to the user(s) and can automatically calculate the royalty attributed to the original writer of the document. Another advantage is to allow the first requester of the translation to profit from subsequent requester(s) since a good article or document is likely to be requested multiple times. The translation, however, only needs to be performed once. In another embodiment, TOD system is capable of revising the translation according to the new formation received. For example, if a large tsunami just landed at Japan shoreline, the first requester of translating the tsunami related news from Japanese to English can share a portion of fee paid by the subsequent requesters for the same news. In other words, the first requester can take a portion of the fee paid by subsequent requesters although the paid fee by the subsequent requesters is likely to be less than the fee paid by the first requestor because the translation has already been performed. In addition to the payment of the first requester, the payment made by the subsequent requester(s), in one embodiment, will be shared by the original writer, the host of TOD system, and the translation service provider. TOD system 410 encourages writers to increase their publications over the Internet because TOD system 410 is capable of presenting such publications to an audience who speak different languages. As such, TOD system facilitates and allows Internet users participating translation biddings as well as benefiting from such participations.

The present invention includes various processing steps, which will be described below. The steps of the present invention may be embodied in machine or computer executable instructions. The instructions can be used to cause a general purpose or special purpose system, which is programmed with the instructions to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein are equally applicable to other network infrastructures or other data communications environments.

Figure 5:
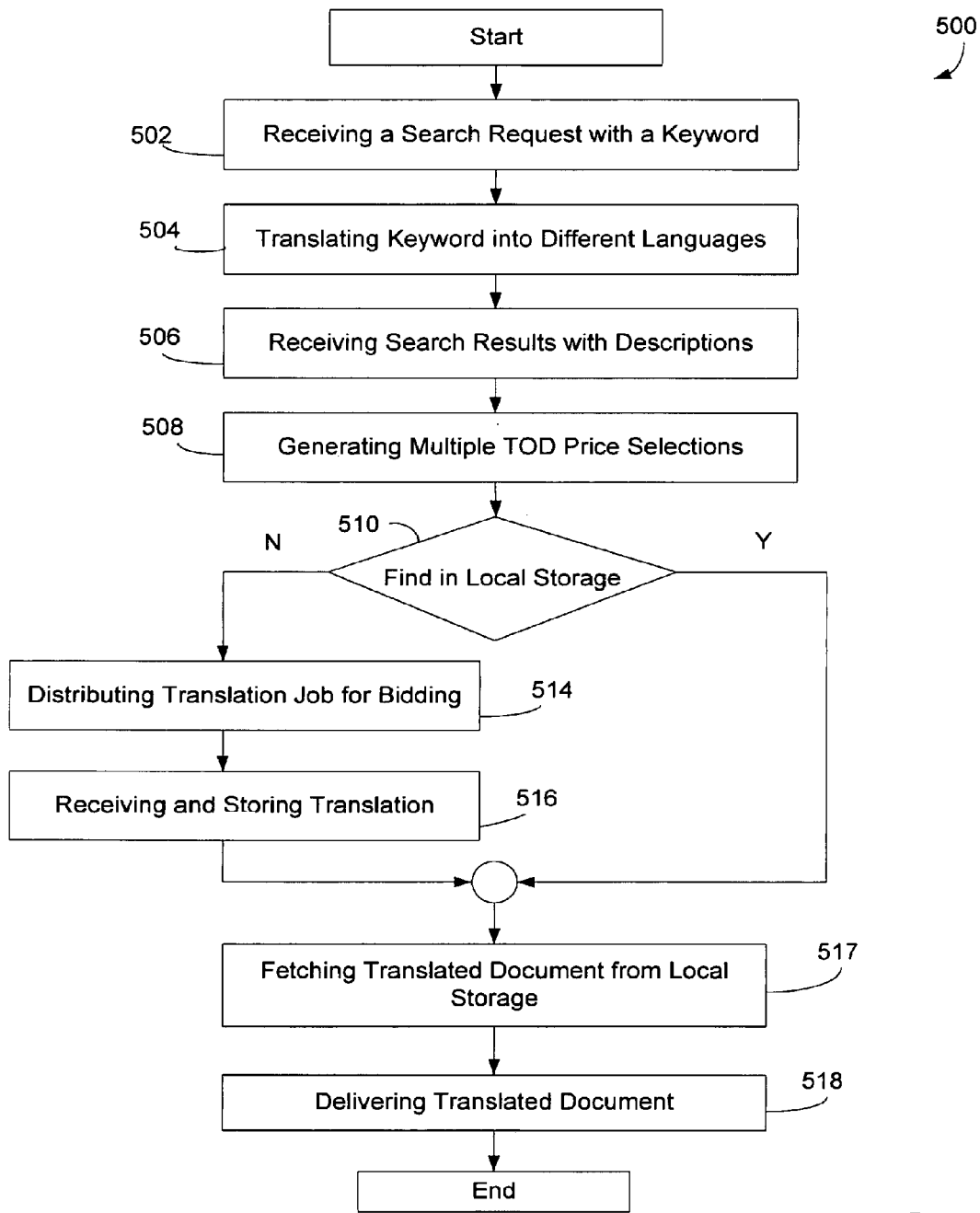
FIG. 5 is a flowchart illustrating a process of implementation of TOD in accordance with one embodiment of the present invention.

FIG. 5 is a flowchart illustrating a process 500 of worldwide search and translation on demand using a TOD system in accordance with one embodiment of the present invention. At block 502, the TOD system receives a search request with a search term such as a search keyword(s) from a user across a communication network. The search term can be a one word search key word or a sentence with multiple search terms. The search request, in one embodiment, specifies number of languages that the term should be searched. After the search request and term are received, the process proceeds to block 504.

At block 504, the process uses automatic translation software ("ATS"), which could reside within the TOD system or reside at a remote server or a portion of ATS is located within the TOD system and another portion of ATS is located remotely. For example, if the native language is Chinese, an ATS module for translating Chinese to English may reside within the TOD system while an ATS module for translating Chinese to Russian may reside at a remote server connected to the TOD system by a communication network. ATS translates the search term from the native language to at least one or more foreign languages according to the specifications defined in the search request. If, however, the search request does not specify how many languages should be translated, ATS translates the search term according to a predefined default value, which may indicate that the search term should be translated into English, Japanese, German, Russian, French and Spanish.

In another embodiment, the TOD system stores some translated search terms or keywords together with the search requests in a local memory. For example, the TOD system may store the last 10,000 search terms. In this embodiment, the TOD system will search its local memory first to determine whether the search term specified by the search request has been translated before and if it has, whether the translated search term according to the search request is present in the local memory. If the TOD system determines that the translated search term is in the local memory, the translated search term will be fetched. For example, if a natural disaster has just happened, large hits for information relating to the disaster over the Internet may happen. In this scenario, saving the translated search term can enhance the performance of the TOD system. After obtaining the translated term, the process moves to the next block.

At block 506, the process activates a search engine or a web browser to perform a worldwide search according to the translated term. Alternatively, the process activates a search within one website which supports multiple languages. For example, if the native language is English, the term in Chinese will be used to search in Chinese websites, the term in German will be used to search in German websites, and the term in the native language is used to search in English websites. Upon receipt of numerous search results in response to the worldwide search, the process evaluates the search results and organizes the search results in an order according to the search request. For example, the user may specifically request that the most recent article should be ordered on the top of list. In the event that the search request does not specify the order, the process orders the search results according to a predefined default value. Each entry of a search result also includes a brief description (or abstract) of the search result presented in the native language and TOD price selections. After receipt of the search results, an abstract or a brief summary of every search result is obtained by the process. If the search results, such as documents or songs, are obtained in foreign websites, the abstracts or summaries of the search results are translated from the foreign language into the native language by ATS. The translated abstracts or summaries should provide enough information relating to the general content of the search results. The process moves to the next block.

At block 508, the process generates a list of TOD price selections next to each entry of the search result allowing a user to place an order to translate the associated search result. Different TOD price selection requests proportionally different monetary payment. For example, if the search result such as a document is already translated, the TOD price will be less expensive than the document requiring translation. Also, the translation performed by a language student will cost less than the translation performed by a professional translator. In one embodiment, calculating the TOD price involves many factors such as original writer's loyalty, availability of the translated document in the local storage, language to be translated, and so forth. Once the entries for the search results are obtained, the entries are displayed. After displaying the entries, the process moves to the next block.

At block 510, after the user selects a TOD price selection associated with a selected document, the process first performs a local search to determine whether the selected document has been translated before and whether the translated document is stored in the local storage if it has already been translated. In one embodiment, the TOD system maintains a table indicating translated documents in the local storage. If the translated document is in the local storage, the process proceeds to block 517. If, however, the translated document is not found in the local storage, the process proceeds to block 514.

At block 514, if the translated document is not found in the local storage, the process proceeds to compose a translation job order, which will subsequently be distributed for bidding. The translation job order should include the language to be translated, the delivery date and/or the requirement of proficiency. Once the translation job order is generated, the order is distributed to various certified translation providers worldwide for bidding. After block 514, the process moves to block 516.

At block 516, the process receives and evaluates the bids according to the bidding rules over the Internet. Once a bid is accepted in accordance with the bidding rules, the process informs the bid winning translator and places a translation order with the bid winning translator. After receiving the translation (or translated document), the process stores the translation in the local storage. The process moves to the next block.

At block 517, the process fetches the translation or translated document from the local storage. It should be noted that the local storage can reside at a remote server connected to the TOD system via a communications network such as the Internet. After the translated document is obtained from the local storage, the process moves to block 518.

At block 518, the process formats the translated document or translation into a delivery format specified by the user. For instance, the user may want the translated document in a PDF format. In one embodiment, the process also recertifies the winner of the bids to determine whether the bid winning translator delivers a satisfactory service. The recertification may accept inputs from the user and/or the TOD system. The process ends.

The present invention discloses a TOD system that uses a combination of automated translation and professional translators for Internet and/or wireless platforms. The TOD system mitigates the language barrier over the Internet or World Wide Web access, and allows a user to find other interactive users, related documents or songs through Internet and/or wireless searches. The "Translation On demand" bidding technique as disclosed allows users to access translation professionals worldwide and to obtain a cost effective way to translate their selected materials (i.e., documents, songs, news, books). Similarly, the TOD system allows translation providers to provide their services globally. In order words, the TOD system enables a user to access websites crossing the language boundary.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for providing translation on demand over a network, comprising:
   receiving a search request with a search term in a first language over said network;
   translating said search term into a second language utilizing automatic translation software ("ATS") in response to said search request;
   performing a search with said search term in both said first language and said second language;
   receiving a plurality of search results in response to outcome of said search, wherein each entry of said search results further includes a brief description of a document of said search results presented in said first language;
   generating multiple translation on demand ("TOD") price selections for each said document, wherein said TOD price selections allow a user to place an order to said document;
   receiving said TOD price selection from said user;
   fetching a translated document in accordance with said TOD price selection from a local storage if said document is already translated and stored in said local storage;
   distributing a translation job order over said network for bidding if said translated document is not found in said local storage;
   receiving bids from translation service providers over said network in response to said translation job order;
   accepting one of said bids in response to a set of predetermined bidding rules; and
   placing a translation order with a bid-winning translator in response to said one of said bids.

2. The method of claim 1, further comprising:
   receiving said translated document from said bid-winning translator in response to said translation order;
   delivering said translated document to said user with a selected delivery format; and
   recertifying said bid-winning translator in response to inputs from said user.

3. The method of claim 1, wherein receiving a search request with a search term further includes accepting said search request from a user over the Internet.

4. The method of claim 1, wherein said translating said search term into a second language utilizing automatic translation software ("ATS") further includes:
   translating said search term into a second language utilizing ATS in accordance with said search request; and
   translating said search term into a second language utilizing ATS in accordance with default translation criteria if said search request does not contain a translation criterion.

5. The method of claim 1, wherein performing a search with said search term further includes:
   retrieving said plurality of search results from a local memory if said search term has been searched before and have substantially same search request; and
   performing a worldwide search over the Internet if said plurality of search results are not found in said local memory.

6. The method of claim 1, wherein generating multiple TOD price selections further includes:
   determining how many languages to be translated for said document;
   estimating number of words in said document;
   calculating time requirement for said translation;
   calculating copyright loyalties for original author of said document; and
   reducing price if said document is already been translated.

7. The method of claim 1, further comprising:
   translating said search term to a plurality of languages; and
   conducting a worldwide search with said search term in said plurality of languages.

8. A translation on demand ("TOD") system for network communications, comprising:
   a receiver capable of receiving a search request with a search term in a native language over a communications network;
   a processor coupled to said receiver and configured to translate said search term into multiple foreign languages using automatic translation software ("ATS") in response to said search request;
   a searching engine coupled to said processor and configured to perform a search in response to said search term in said multiple foreign language;
   a display coupled to said processor and capable of receiving a plurality of search results in response to outcome of said search, wherein each entry of said search results further includes a brief description of a document of said search results presented in said first language;
   a selection device coupled to said processor and capable of generating multiple TOD price selections for each said document, wherein said TOD price selections allow a user to place an order to said document, wherein said processor is configured to fetch a translated document from a local storage if said document is already translated and stored in said local storage;
   a translation bidding device coupled to said processor and configured to distribute a translation job order over said network for bidding if said translated document is not found in said local storage, wherein said bidding device is configured:
   to receive bids from various certified translation companies over said network;
   to evaluate said bids according to predetermined bidding rules;
   to accept one of said bids in response to said predetermined bidding rules; and
   to select one of said various certified translation companies as a bid-winning translation company for converting said document from said native language to said foreign languages.

9. The system of 8, wherein said processor is further configured to:
   receive said translated document from said bid-winning translation company;
   deliver said translated document to said user with a selected delivery format; and
   recertify said bid-winning translation company according to inputs from said user.

10. The system of 8, wherein said network is one of Internet, wireless network, and World Wide Web.

11. The system of 8, wherein said search request further includes information specifying number of foreign languages to be translated.

12. The system of 8, wherein said multiple TOD price selections are calculated based on which language to be translated and loyalty cost.

13. An apparatus for providing translation on demand over a network, comprising:
   means for receiving a search request with a search term in a first language over said network;
   means for translating said search term into a second language utilizing automatic translation software ("ATS") in response to said search request;
   means for performing a search with said search term in both said first language and said second language;
   means for receiving a plurality of search results in response to outcome of said search, wherein each entry of said search results further includes a brief description of a document of said search results presented in said first language;
   means for generating multiple translation on demand ("TOD") price selections for each said document, wherein said TOD price selections allow a user to place an order to said document;
   means for receiving a TOD price selection from said user;
   means for fetching a translated document in accordance with said TOD price selection from a local storage if said document is already translated and stored in said local storage;
   means for distributing a translation job order over said network for bidding if said translated document is not found in said local storage;
   means for receiving bids from translation service providers over said network in response to said translation job order;
   means for accepting one of said bids in response to a set of predetermined bidding rules; and
   means for placing a translation order with a bid-winning translator in response to said one of said bids.

14. The apparatus of claim 13, further comprising:
   means for receiving said translated document from said bid-winning translator in response to said translation order;
   means for delivering said translated document to said user with a selected delivery format; and
   means for recertifying said bid-winning translator in response to inputs from said user.

* * * * *